US007873598B2

(12) United States Patent
Shi et al.

(10) Patent No.: US 7,873,598 B2
(45) Date of Patent: Jan. 18, 2011

(54) SLICING OF RELATIONAL DATABASES

(75) Inventors: Hui Shi, Redmond, WA (US); Kenton Gidewall, Snohomish, WA (US); Marcelo M. De Barros, Redmond, WA (US); Chan Chaiyochlarb, Redmond, WA (US); Murali R. Krishnan, Bellevue, WA (US); Robert Irwin Voightmann, Potomac, MD (US); Christina Ruth Dhanaraj, Carmel, IN (US)

(73) Assignee: Microsoft Corporation, Redmond, WA (US)

( * ) Notice: Subject to any disclaimer, the term of this patent is extended or adjusted under 35 U.S.C. 154(b) by 436 days.

(21) Appl. No.: 12/103,699

(22) Filed: Apr. 15, 2008

(65) Prior Publication Data

US 2009/0259618 A1 Oct. 15, 2009

(51) Int. Cl.
*G06F 7/00* (2006.01)
*G06F 17/00* (2006.01)

(52) U.S. Cl. ..................... 707/624; 707/626
(58) Field of Classification Search ................ 707/624, 707/626, 999.204
See application file for complete search history.

(56) References Cited

U.S. PATENT DOCUMENTS

| 5,701,460 | A | 12/1997 | Kaplan et al. | |
|---|---|---|---|---|
| 5,758,337 | A | 5/1998 | Hammond | |
| 6,931,390 | B1 * | 8/2005 | Zait et al. | 1/1 |
| 6,951,013 | B1 | 9/2005 | Lozins | |
| 7,058,621 | B1 * | 6/2006 | Wolge | 1/1 |
| 2004/0226006 | A1 * | 11/2004 | Russell | 717/154 |
| 2005/0198074 | A1 * | 9/2005 | Khayter et al. | 707/104.1 |
| 2006/0074858 | A1 | 4/2006 | Etzold et al. | |
| 2006/0253473 | A1 | 11/2006 | Agrawal et al. | |

OTHER PUBLICATIONS

Rayside "A Generic Worklist Algorithm for Graph Reachability Problems in Program Analysis", Derek Rayside, 2001, pp. 143.
Willmor, et al., "Program Slicing in the Presence of Database State", 20th IEEE International Conference on Software Maintenance (ICSM'04), 2004, pp. 5.
"Reduce Size Requirements for Your Enterprise Application Testing Environment to Facilitate Testing and Development", Applimation, 2008, pp. 2.
DeBarros,et al., "Binary Checksum Query Better for Big Table Samplings", Jun. 2007, SQL Server Magazine, Penton Media, Inc., pp. 2.

* cited by examiner

*Primary Examiner*—Hosain T Alam
*Assistant Examiner*—Van H Oberly
(74) *Attorney, Agent, or Firm*—Capitol City TechLaw; Richard C. Irving (57) ABSTRACT

A method and a processing device may be provided for creating a shadow database, having a size being approximately a desired percentage of a size of a relational database. Referential integrity of tables of the relational database may be preserved in the created shadow database. A representation of a connected graph may be created, based on a schema description of the relational database, and may be used to find driving tables and related tables of the relational database. Portions of driving tables of the relational database may be copied to corresponding tables of the shadow database and rows of tables of the relational database, related to the copied portions of the driving tables, may be copied to corresponding tables of the shadow database in a number of iterations until the size of the shadow database is approximately the desired percentage of the size of the relational database.

20 Claims, 7 Drawing Sheets

| DB SIZE | # TABLES | PERCENT SLICED ACTUAL/ASKED |
|---|---|---|
| 1 GB | 42 | 10.02489 / 10 |
| 1 GB | 42 | 40.01639 / 40 |
| 4 GB | 25 | 9.983097 / 10 |
| 4 GB | 25 | 40.00251 / 40 |
| 9 GB | 4 | 10.02141 / 10 |
| 9 GB | 4 | 39.88654 / 40 |

*FIG. 9*

SLICING OF RELATIONAL DATABASES

BACKGROUND

Real data from databases are ideal for functional and performance testing of software. Software testing with real data may expose software bugs that would normally be missed when software testing with data generated specifically for testing. A volume of data from a real database usually is too large for a test environment due to storage, time and budget constraints. Therefore, the use of real data from databases for software testing is rare.

A subset of real data from databases may be used for software testing. However, when using relational databases, creating a subset of a database, while preserving referential integrity among tables, is difficult.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a method and a processing device may be provided for slicing, approximately, a desired percentage of a relational database and copying the sliced approximate desired percentage of the relational database to a shadow database, while preserving referential integrity among tables of the created shadow database.

In an embodiment consistent with the subject matter of this disclosure, a representation of a connected graph may be created based on a schema description of a relational database. Tables of the relational database may be represented as nodes of the connected graph, while foreign keys of the relational database may be represented as edges of the graph. The graph may be traversed to determine driving tables, as well as an order of dependencies among the tables of the relational database.

A desired portion of the driving table may be randomly selected and copied to a corresponding table in a shadow database. In some embodiments, a fixed smaller portion of the driving table may be randomly selected and copied in a number of iterations. Tables related to the driving table may be found by traversing the created representation of the connected graph. Rows of the related tables may be copied to corresponding tables of the shadow database.

A determination may be made regarding whether the shadow database has a size less than or equal to the desired percentage of a size of the relational database. If the shadow database is determined to have a size less than or equal to the desired percentage of the size of relational database, the above described process may be repeated, with respect to the tables of the relational database.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

A method and a processing device are provided for slicing a portion of data from tables in a relational database while preserving referential integrity among the tables. In embodiments consistent with the subject matter of this disclosure, a representation of a connected graph of relationships among tables of a relational database may be created. The tables of the relational database may be represented by nodes in the graph, while relationships among the tables, as may be defined by foreign keys, may be represented by edges between the nodes The graph may be traversed to determine an order of dependencies among the tables.

A driving table may be a table to which no foreign keys from other tables point. A driving table may be found by referring to the created representation of the connected graph. A desired portion of the driving table may be randomly selected and copied to a corresponding table in a shadow database. If a relational database has multiple driving tables, then one of the driving tables may be randomly selected as a first driving table to process. In some embodiments, a fixed subset of a given desired percentage of rows of a driving table may be copied to a corresponding table in a shadow database in a number of iterations. The created representation of the connected graph may be traversed to find a table related to the driving table. Rows of the found table related to the copied rows of the driving table may be copied to a corresponding table of the shadow database. The created graph may be traversed further to find additional tables related to the copied tables, such that corresponding rows of the additional tables, related to rows of the copied tables, may be copied to corresponding tables of the shadow database.

The created representation of the graph may be traversed to find other driving tables and a process, as described above, may be repeated for the found other driving tables and tables related to the found driving tables.

A determination may then be made regarding whether the shadow database has a size less than or equal to the desired percentage of a size of the relational database. If the shadow database has a size less than or equal to the desired percentage of the size of the relational database, then the above described process may be repeated for the driving tables and the related tables.

In one embodiment consistent with the subject matter of this disclosure, a determination may be made regarding whether any foreign keys exist in a relational database. If there are no foreign keys in the relational database, then approximately the desired percentage of each table may be randomly selected and copied to corresponding tables of the shadow database.

Exemplary Processing Device

Figure 1:
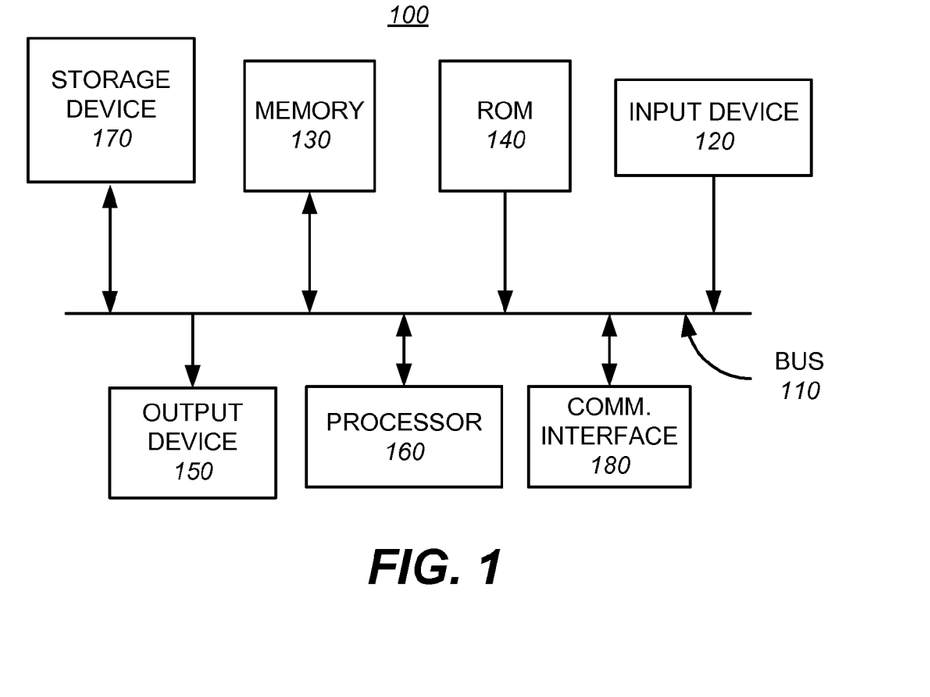
FIG. 1 illustrates a functional block diagram of an exemplary processing device, which may implement embodiments consistent with the subject matter of this disclosure.

FIG. 1 is a functional block diagram of an exemplary processing device 100, which may be used to implement embodiments consistent with the subject matter of this disclosure. Processing device 100 may be a desktop personal computer (PC), a laptop PC, or other processing device. Processing device 100 may include a bus 110, an input device 120, a memory 130, a read only memory (ROM) 140, an output device 150, a processor 160, and one or more storage devices 170. Bus 110 may permit communication among components of processing device 100.

Processor 160 may include at least one conventional processor or microprocessor that interprets and executes instructions. Memory 130 may be a random access memory (RAM) or another type of dynamic storage device that stores information and instructions for execution by processor 160. Memory 130 may also store temporary variables or other intermediate information used during execution of instructions by processor 160. ROM 140 may include a conventional ROM device or another type of static storage device that stores static information and instructions for processor 160. Storage device 170 may include compact disc (CD), digital video disc (DVD), a magnetic medium, a flash RAM device, or other type of storage device for storing data and/or instructions for processor 160.

Input device 120 may include a keyboard, a pointing device or other input device. Output device 150 may include one or more conventional mechanisms that output information, including one or more display monitors, or other output devices.

Processing device 100 may perform functions in response to processor 160 executing sequences of instructions contained in a tangible machine-readable medium, such as, for example, memory 130, ROM 140, storage device 170 or other media. Such instructions may be read into memory 130 from another machine-readable medium or from a separate device via communication interface 180.

Exemplary Connected Graph

Figure 2:
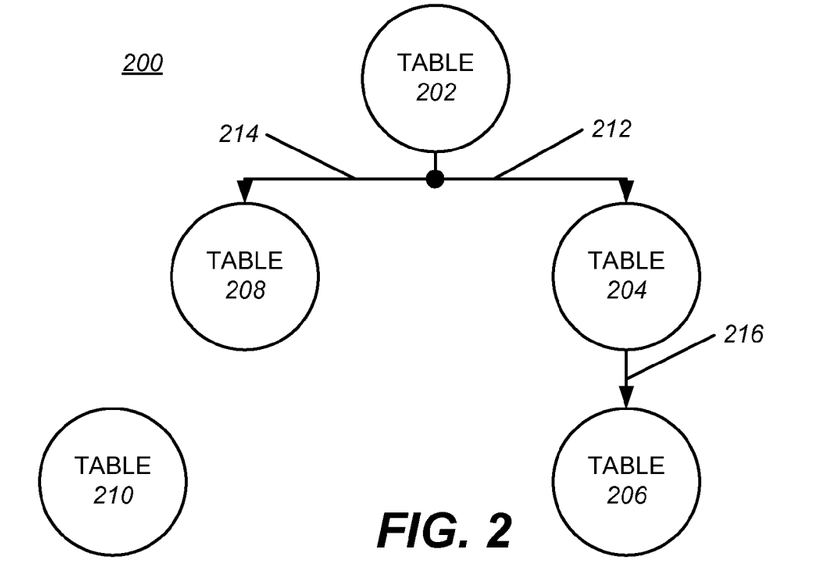
FIG. 2 illustrates a connected graph representing tables and foreign keys of an exemplary relational database.

FIG. 2 is an exemplary connected graph 200, a representation of which may be created by a processing device implementing an embodiment consistent with the subject matter of this disclosure. The representation of exemplary connected graph 200 may be created by the processing device after examining a subschema description of a relational database. Tables 202-210, shown as nodes of connected graph 200, may represent tables of the relational database. Edges 212-216 between nodes may represent foreign keys. For example, a foreign key of table 202 may refer to a primary key of table 204, and may point to a particular record of table 204. As an example, assuming that table 202 is a table of customers and table 204 is a table of salesmen responsible for particular customers, customer records of table 202 may each have a foreign key pointing to a corresponding salesman record of table 204.

Table 202 and table 210 of connected graph 200 are both driving tables. Each record, or row, of table 202 may include a foreign key 212 pointing to a corresponding record, or row, of table 204 and a foreign key 214 pointing to a corresponding record, or row, of table 208. Each record, or row, of table 204 may include a foreign key 216 pointing to a corresponding record, or row, of table 206. Table 210 may not include any foreign keys and may not be pointed to by foreign keys included in rows of other tables.

Connected graph 200 has two connected components. A first connected component includes tables 202-206 and foreign keys 212-216. A second connected component includes table 210.

Connected graph 200 is only exemplary. Other representations of connected graphs, which may be created by embodiments consistent with the subject matter of this disclosure, may include more or fewer nodes, or tables, and may include more or fewer foreign keys, or edges.

Exemplary Processing

FIGS. 3-6 are flowcharts illustrating exemplary processes for slicing a relational database. The processes may be performed by a processing device, such as, for example, processing device 100, or another processing device. The process may begin with the processing device extracting information from a schema description of the relational database (database constraints) and saving the information in files (act 302). The information may include information with respect to tables, indexes, and foreign keys, as well as other information. In some embodiments, information with respect to each table may be saved in a separate file. The files may include extensible Markup Language (XML) files or other types of files.

Figure 3:
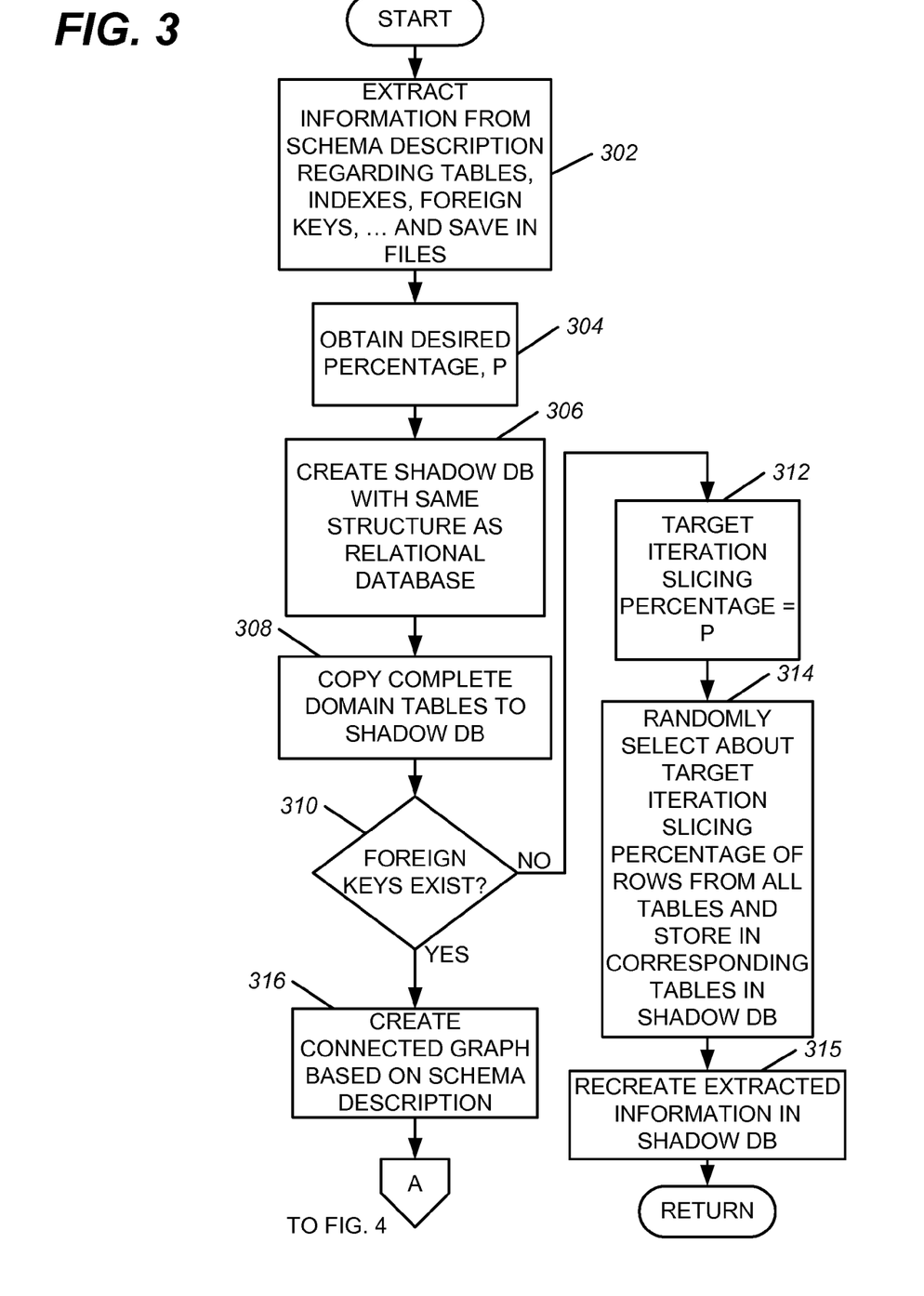
FIGS. 3-8 are flowcharts illustrating exemplary processes, which may be performed in embodiments consistent with the subject matter of this disclosure.

Next, the processing device may obtain a desired percentage, p (act 304). The desired percentage, p, may be a desired percentage of a size of the relational database to be sliced and copied to a new database, such as, a shadow database. The processing device may create the shadow database, based on the schema description of the relational database, such that the shadow database has a same structure as the relational database (act 306). At this point, the newly created shadow database may have a same table structure as the relational database, but may not have database constraints of the relational database, such as foreign keys, indexes, and other constraints.

The processing device may then copy, completely, each domain table to a corresponding table of the shadow database (act 308). A domain table may include a list of all valid types, or enumerations that fall into a particular category. A table including a list of all 50 valid state abbreviations is an example of a domain table. In one embodiment, all domain tables may be manually marked to make later identification of tables as domain tables easy.

The processing device may then determine whether foreign keys exist in the relational database (act 310). If foreign keys are determined not to exist in the relational database, then a target iteration slicing percentage may be set to the desired percentage, p (act 312) and, approximately, the target iteration slicing percentage of rows from all tables of the relational database, with the exception of the previously copied domain tables, may be randomly selected and stored in corresponding tables of the shadow database (act 314). The extracted information (database constraints) may then be recreated in the shadow database (act 315). The process may then be completed.

Figure 7:
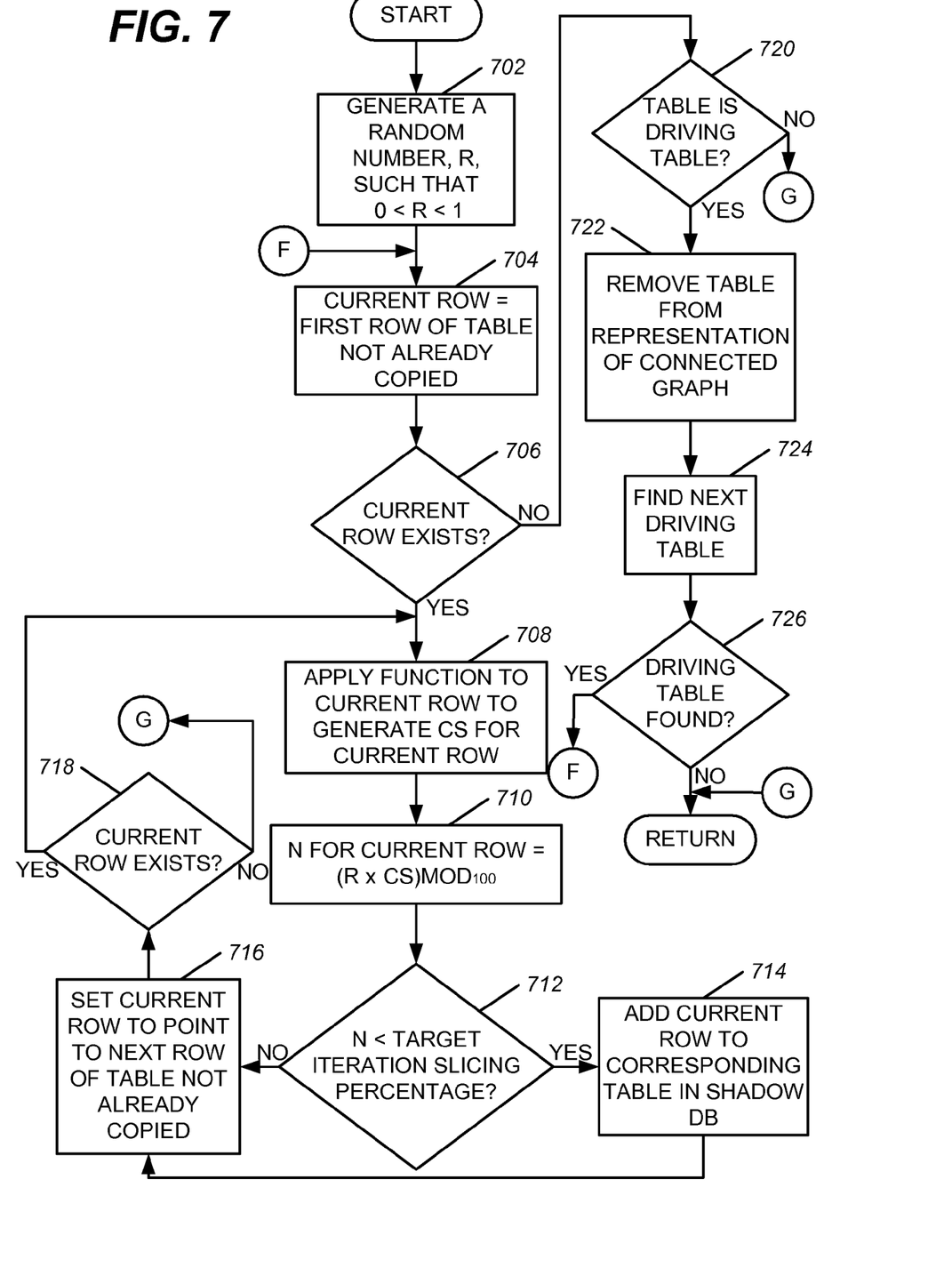

FIG. 7 is a flowchart of an exemplary process for randomly selecting a target iteration slicing percentage of rows of a table of the relational database and copying the selected rows to a corresponding table in the shadow database. The processing may begin with the processing device generating a random number, R, such that 0<R<1 (act 702).

The processing device may then set a current row to a first row of the table, which has not yet been copied to a corresponding table in the shadow database (act 704). The processing device may then determine whether the current row exists (act 706). At this point, the current row may not exist if all rows of the table have already been copied to the corresponding table of the shadow database.

If the current row exists, the processing device may apply a function to the current row to generate an integer value, CS, for the current row (act 708). In one embodiment, the applied function may generate a checksum for the current row. In other embodiments, a different function may be applied to the current row to generate the integer value, CS. The processing device may then generate an integer, N, having a value between 0 and 99, inclusive, by calculating $$N=(R \times CS)MOD_{100}, \text{ where } MOD_{100} \text{ is modulo 100}$$
(act 710).

The processing device may then determine if N is less than the target iteration slicing percentage (act 712). For example, if the target iteration slicing percentage is 10%, then the processing device may determine if N is less than 10. If N is less than the target iteration slicing percentage, then the processing device may add the current row of the table to a corresponding table in the shadow database (act 714). If, during act 712, the processing device determines that N is not less than the target iteration slicing percentage, or after the processing device performs act 714, the processing device may set current row to point to a next row of the table, which has not already been copied to the shadow database (act 716). The processing device may then determine whether the row of the table pointed to by current row exists (act 718). If the row of the table pointed to by current row does not exist, then the process may be completed. Otherwise, the processing device may perform acts 708-718 again.

If, during act 706, the processing device determines that the current row does not exist, then the processing device may determine whether the table is a driving table (act 720). If the table is not a driving table, then the process may be completed. Otherwise, the table may be removed from further consideration by removing the table from the representation of the connected graph (act 722) and an attempt may be made to find a next driving table of the relational database based on the representation of the connected graph with the removed driving table (act 724). The processing device may then determine whether a next driving table was found (act 726). If the next driving table was found, then the processing device may again repeat act 704. Otherwise, the process may be completed.

Returning to FIG. 3, if, during act 310, the processing device determines that at least one foreign key exists in the relational database, the processing device may create a representation of a connected graph, based on the schema of the relational database (act 316). As previously mentioned, tables of the relational database may be represented as nodes of the connected graph and foreign keys may be represented as edges between nodes of the connected graph.

Figure 4:
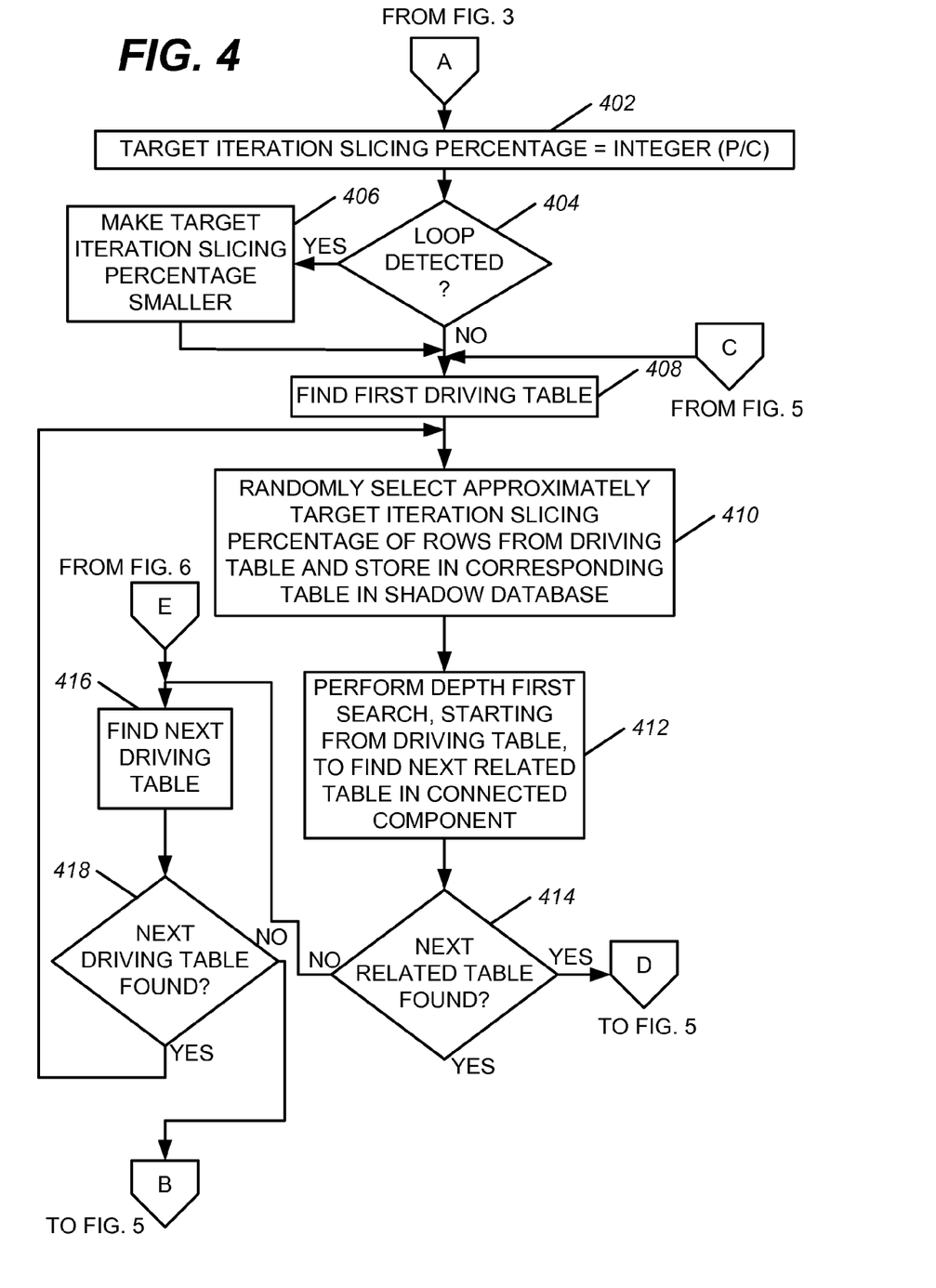

The processing device may then set the target iteration slicing percentage to be equal to an integer formed by dividing the desired percentage, p, by a value, c (integer (p/c)) (act 402; FIG. 4). Thus, if a value of p/c is not an integer, a fractional portion of the value may be truncated, such that the target iteration slicing percentage may be an integer value. In one embodiment, c may have a value of 5. A different value of c may be used in other embodiments consistent with the subject mater of this disclosure.

The processing device may then determine whether a loop exists with respect to tables and foreign keys of the relational database (act 404). The processing device may determine that a loop exists when either rows of a first table have foreign keys pointing to other rows of the first table, or the rows of the first table have foreign keys pointing to rows of an other table, etc., . . . and rows of one of the other tables have foreign keys pointing to rows of the first table. For example, a loop may be detected when rows of a first table have foreign keys pointing to rows of a second table, the rows of the second table have foreign keys pointing to rows of a third table, the rows of the third table have foreign keys pointing to rows of a fourth table, and the rows of the fourth table have foreign keys pointing to the rows of the first table. If the processing device determines that a loop exists, then the target iteration slicing percentage may be made smaller (act 406).

When a loop exists, tables that are included in the loop may have more than the target iteration slicing percentage of rows copied to corresponding tables in the shadow database. In some cases, all data from tables included in the loop may be copied to the shadow database in a single round. Making the target iteration slicing percentage smaller may avoid having all the data from the tables included in the loop copied to the shadow database in a single round. In one embodiment, the previously calculated target iteration slicing percentage may be divided by 2, or an other value, and any fractional part resulting from dividing the target iteration slicing percentage by 2, or the other value, may be truncated, resulting in an integer value.

The processing device may then find a first driving table of the relational database by referring to the representation of the created connected graph (act 408). Approximately, the target iteration slicing percentage of rows may be randomly selected from the driving table and stored in a corresponding table in the shadow database (act 410). The process previously described, with respect to FIG. 7, or another process, may be executed by the processing device to randomly select rows from the driving table and store the randomly selected rows in the corresponding table in the shadow database.

The processing device may then perform a depth first search, starting from the driving table, to find a next related table (act 412). The processing device may reference the created representation of the connected graph when performing the depth first search. A depth first search is a search that considers children of a node before considering any siblings of the node. For example, with reference to FIG. 2, a depth first search may consider tables of connected graph 200 in a following order, starting from table 202: table 208; table 204; table 206; and table 210.

Figure 5:
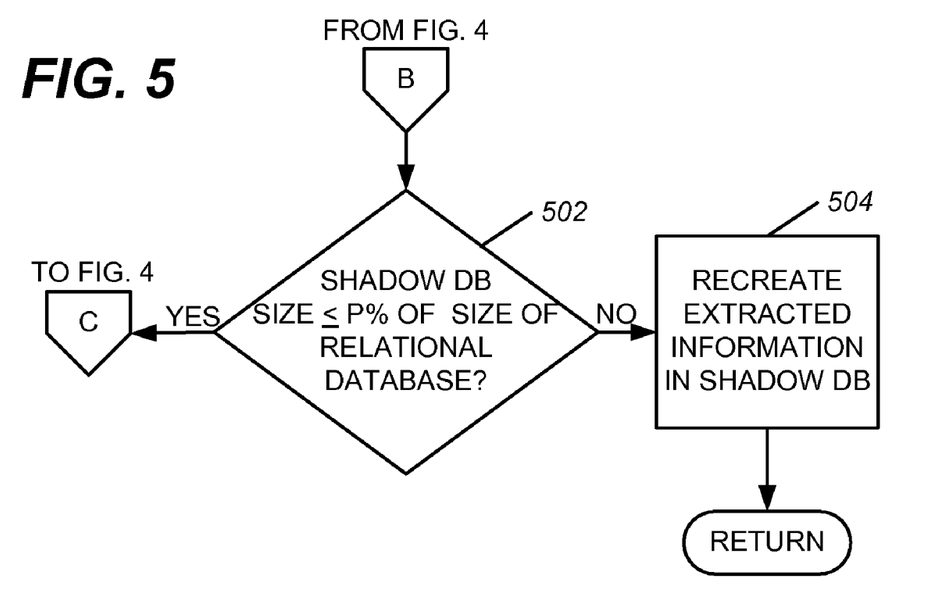

The processing device may then determine whether a next related table was found by the depth first search (act 414). If a next related table was not found, then the processing device may find a next driving table, if one exists, by referring to the created representation of the connected graph (act 416). If a next driving table was found, then the processing device may perform acts 410-418 again. Otherwise, the processing device may determine whether a size of the shadow database is less than or equal to the desired percentage, p, of the size of the relational database (act 502; FIG. 5). If the size of the shadow database is less than or equal to the desired percentage, p, of the size of the relational database, then acts 408-414 may be performed again. Otherwise, the extracted information (database constraints) may be recreated in the shadow database (act 504). The process may be completed.

Figure 6:
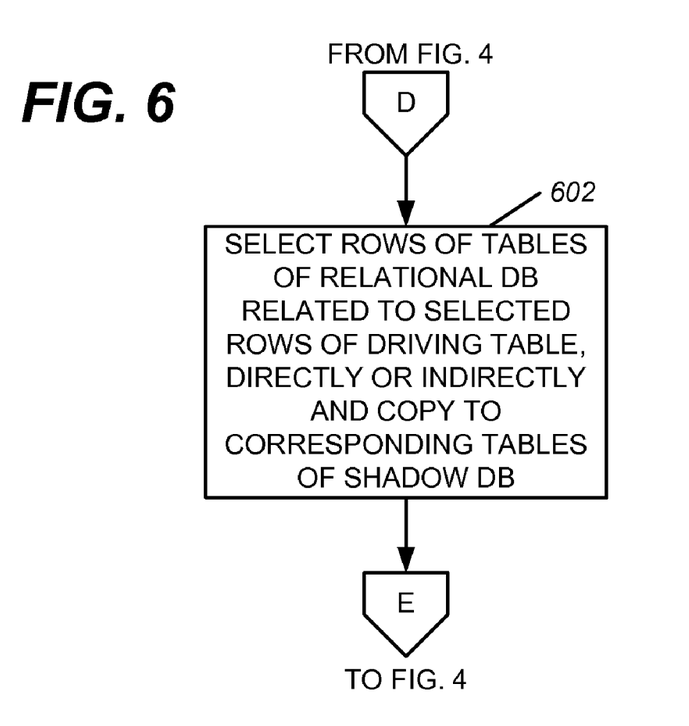

If, during act 414 (FIG. 4), the processing device determines that a next related table is found, then the processing device may select rows of tables of the relational database, related to the selected and copied rows of the driving table, either directly or indirectly, and may copy the selected rows of the tables to corresponding tables of the shadow database (act 602; FIG. 6). The processing device may then perform act 416 of FIG. 4, as previously described.

Figure 8:
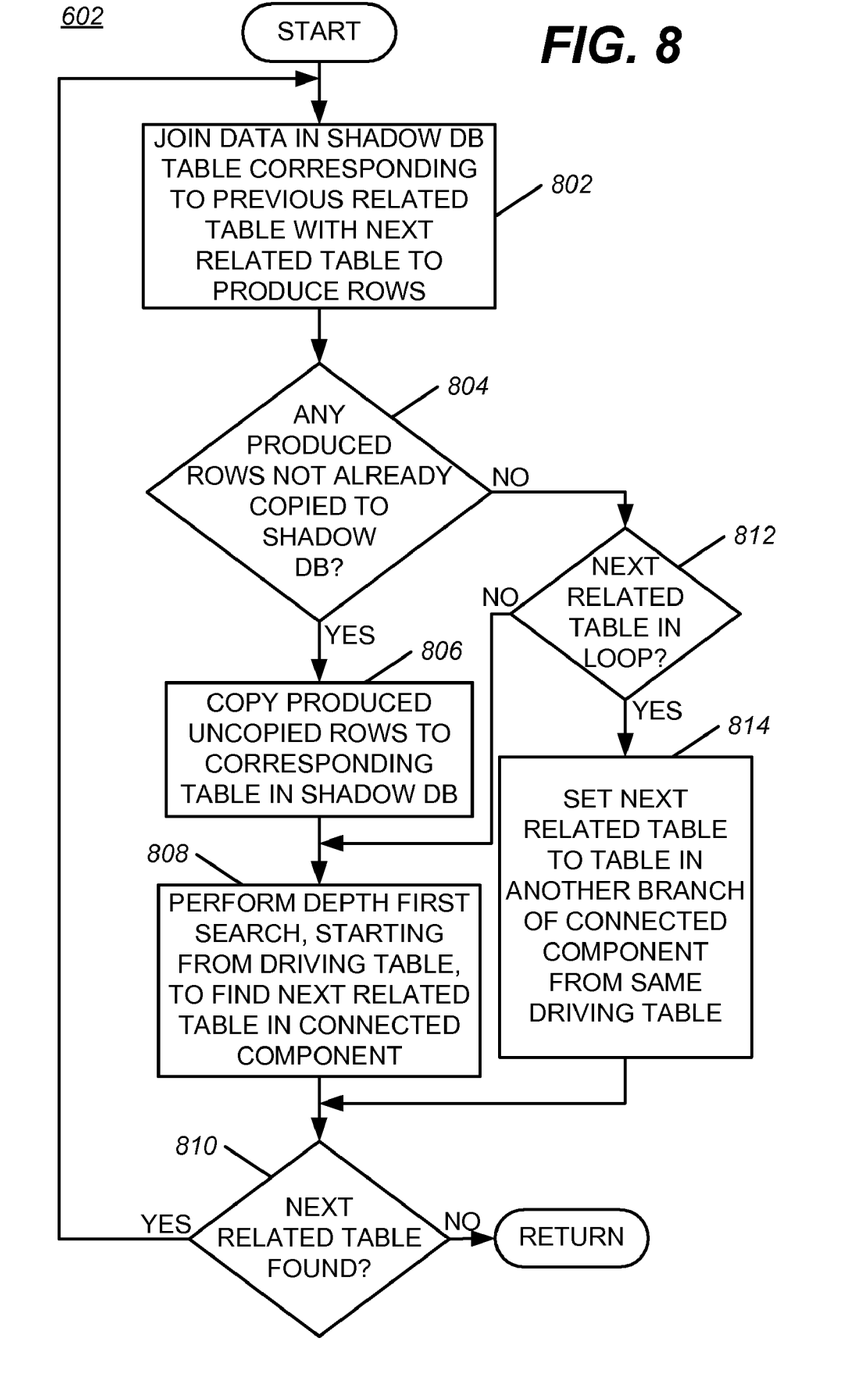

FIG. 8 is a flowchart illustrating an exemplary process for performing act 602 of FIG. 6. The process may begin with the processing device joining data in a table of the shadow database, corresponding to a previous related table of the relational database, with the found next related table of the relational database to produce rows of data (act 802). For example, with reference to connected graph 200, if the next related table is table 206, then the previous related table is table 204, and if the next related table is table 204, then the previous related table is table 202.

The processing device may then determine whether any of the produced rows were not already copied to the shadow database (act 804). If at least one of the produced rows was not already copied to the shadow database, then the processing device may copy uncopied ones of the produced rows to a corresponding table in the shadow database (act 806). The processing device may then perform a depth first search to find a next related table of the relational database, with reference to the created representation of the connected graph (act 808). The processing device may then determine whether a next related table was found (act 810). If a next related table was not found, then the process of FIG. 8 may be completed. Otherwise, the processing device may again perform act 802.

If, during act 804, the processing device determines that none of the produced rows were not already copied to the shadow database (i.e., all of the produced rows were already copied to the shadow database), then the processing device may determine whether the next related table is included in a loop (act 812). If the processing device determines that the next related table is included in a loop, then the processing device may attempt to find a new next related table in another branch of a connected component from a same driving table (act 814). For example, with reference to FIG. 2, if tables 202, 204, and 206 are in a loop, and joining data in a table corresponding to table 202 in the shadow database with table 204 does not produce rows not already present in a table in the shadow database corresponding to table 204, then an attempt may be made to find a next related table in another branch of the connected component, such as, for example, table 208. Otherwise, the processing device may perform a depth first search to find a next related table of the relational database, with reference to the created representation of the connected graph (act 808), as previously described.

After performing either act 808 or act 814, the processing device may perform act 810, as previously discussed.

A side effect of copying data from a table in a loop is that more data than was requested may be copied to the shadow database. However, referential integrity is preserved. For this reason, when a loop is detected in a connected graph, a smaller target iteration percentage may be used (see act 406 of FIG. 4) in order to avoid a scenario in which all data from tables connected in a loop may be copied to the shadow database in a single iteration.

Returning to FIG. 6, after performing act 602, the processing device may again perform act 416 (FIG. 4) to find a next driving table, as previously discussed.

Experimental Results

Figure 9:
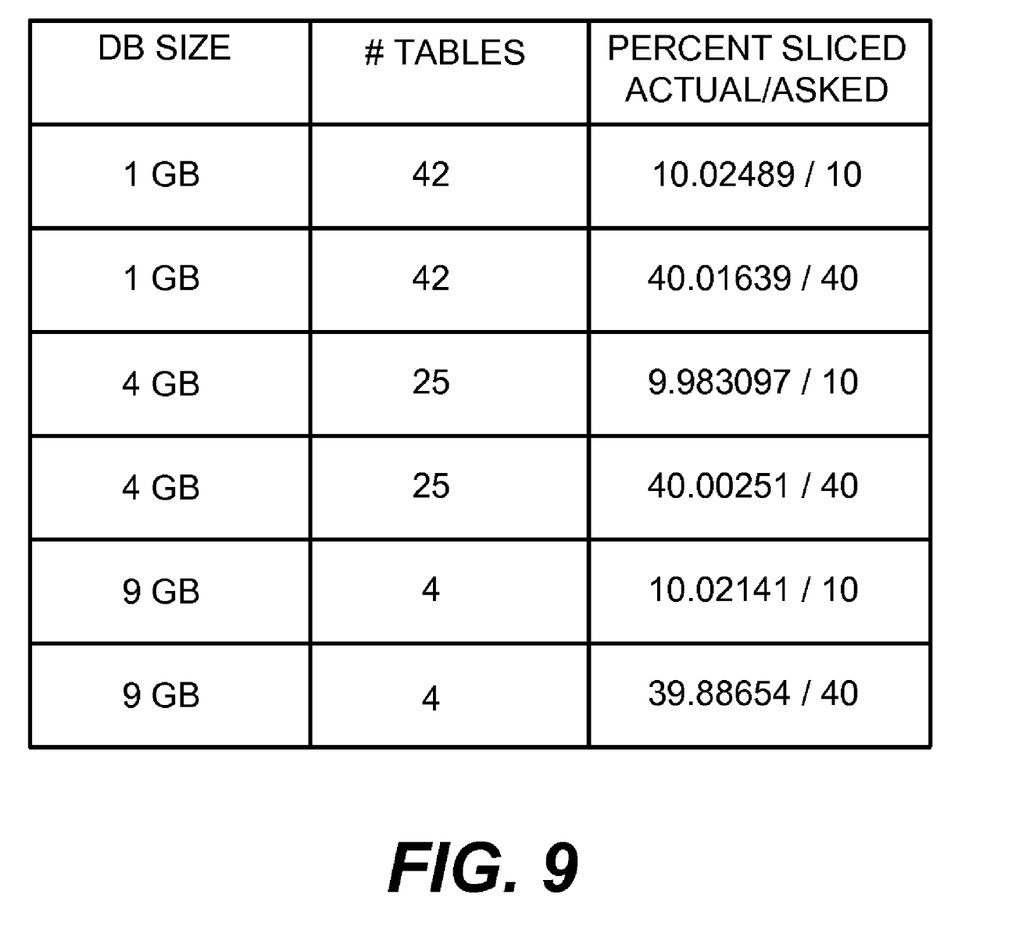
FIG. 9 is a table illustrating experimental results achieved by an embodiment consistent with the subject matter of this disclosure.

FIG. 9 is a table illustrating experimental results from an embodiment consistent with the subject matter of this disclosure. As can be seen in FIG. 9, when a relational database had a size of 1 GB and had 42 tables, slicing the relational database to create a shadow database having a size of 10% of the size of the relational database resulted in the shadow database having a size of 10.02489% of the relational database. When slicing a same relational database to create a shadow database having a size of 40% of the size of the relational database, the created shadow database had a size of 40.01639% of the size of the relational database. When the size of the relational database was 4 GB and included 25 tables, slicing the relational database to create the shadow database having a size of 10% of the size of the relational database resulted in the shadow database having a size of 9.983097% of the relational database. When slicing a same relational database to create a shadow database having a size of 40% of the size of the relational database, the created shadow database had a size of 40.00251 % of the relational database. When the size of the relational database was 9 GB and included 4 tables, slicing the relational database to create the shadow database having a size of 10% of the size of the relational database, resulted in the shadow database having a size of 10.02141% of the relational database. When slicing a same relational database to create a shadow database having a size of 40% of the size of the relational database, the created shadow database had a size of 39.88654% of the relational database.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described with respect to FIGS. 3-8, or may implement acts in a different order than as shown. Accordingly, the appended claims and their legal equivalents define the invention, rather than any specific examples given.

We claim as our invention:

1. A machine-implemented method for slicing a relational database while preserving referential integrity, the machine-implemented method comprising:
 copying, completely, all domain tables of the relational database to a shadow database, the shadow database having a same structure as the relational database;
 dividing a desired percentage, p, by a value, c, to create a target iteration slicing percentage of p/c;
 determining whether foreign keys exist in the relational database; and
 performing a plurality of acts, when the foreign keys are determined to exist in the relational database, the plurality of acts comprising:

determining whether a size of the shadow database is less than the desired percentage, p, of a size of the relational database, repeating a second plurality of acts when the size of the shadow database is determined to be less than the desired percentage of the size of the relational database, the second plurality of acts comprising:

randomly selecting, approximately, the target iteration slicing percentage, p/c, of data from a driving table of the relational database,     copying previously uncopied ones of the randomly selected approximate target iteration percentage, p/c, of the data from the driving table into a table of the shadow database corresponding to the driving table,     performing a depth first search to find a corresponding next related table of the relational database,     copying previously uncopied ones of the corresponding next related table of the relational database, referred to by copied data of a corresponding previous related table of the relational database, to a table of the shadow database corresponding to the corresponding next related table of the relational database, and     repeating the performing of the depth first search, to find a corresponding next related table and the copying of previously uncopied ones of the corresponding next related table of the relational database, referred to by copied data of a corresponding previous related table of the relational database until the depth first search fails to find a next related table, and recreating, in the shadow database, constraints from the relational database.

2. The machine-implemented method of claim 1, further comprising:

repeating the second plurality of acts with respect to all driving tables of the relational database, when the size of the shadow database is determined to be less than the desired percentage, p, of the size of the relational database.

3. The machine-implemented method of claim 1, wherein the randomly selecting of approximately the target slicing percentage, p/c, of the data from the driving table further comprises:

generating a random number, R, such that 0<R<1, and performing a third plurality of acts on each row of the driving table, the third plurality of acts comprising:

applying a function to data of a respective row of the driving table to produce a respective integer, CS,     calculating $N=\mod_{100}(R \times CS)$, and     selecting the respective row from the driving table only when N<integer(p/c), where integer (p/c) is an integer value formed by dividing p by c.

4. The machine-implemented method of claim 1, further comprising:

performing a third plurality of acts when the foreign keys are determined not to exist in the relational database, the third plurality of acts comprising:

randomly selecting, approximately, p % of the data from each respective table of the relational database, and     copying the p % of the data from each respective table of the relational database to a respective corresponding table of the shadow database.

5. The machine-implemented method of claim 1, further comprising:

creating a representation of a connected graph based on a schema description of the relational database, tables of the relational database being represented by nodes of the connected graph, and foreign keys relating to the tables of the relational database being represented by graph edges of the connected graph, wherein the depth first search is performed by referring to the representation of the connected graph.

6. The machine-implemented method of claim 5, wherein:

the copying of previously uncopied ones of the corresponding next related table of the relational database, referred to by copied data of the corresponding previous related table of the relational database further comprises:

joining a table of the shadow database corresponding to the corresponding previous related table of the relational database with the corresponding next related table of the relational database to produce matching rows from the corresponding next related table, and     adding previously uncopied ones of the matching records from the corresponding next related table to a table of the shadow database corresponding to the corresponding next related table, the machine-implemented method further comprising:

detecting whether the corresponding next related table is included in a loop, and attempting to find a new next related table in another branch of the connected graph when the corresponding next related table is detected as being in the detected loop and all of the produced matching rows from the corresponding next related table have already been copied to the shadow database.

7. The machine-implemented method of claim 1, wherein the copying of the previously uncopied ones of the corresponding next related table of the relational database, referred to by the copied data of a corresponding previous related table of the relational database further comprises:

joining a table of the shadow database corresponding to the corresponding previous related table of the relational database with the corresponding next related table of the relational database to produce matching records from the corresponding next related table, and adding previously uncopied ones of the matching records from the corresponding next related table to a table of the shadow database corresponding to the corresponding next related table.

8. A processing device comprising:

at least one processor; and a memory connected to the at least one processor, the memory comprising:

instructions for creating a shadow database having a same structure as a relational database, instructions for completely copying all domain tables of the relational database to corresponding tables of the shadow database, instructions for obtaining a target percentage value, p, instructions for calculating a desired size for a shadow database by calculating (relational database size)×p, instructions for creating a representation of a connected graph based on a schema description of the relational database, nodes of the connected graph representing tables of the relational database, and graph edges connecting ones of the nodes of the connected graph representing foreign keys, instructions for randomly selecting, approximately, a fixed sized portion of the target percentage, p, of rows of a driving table of the relational database, instructions for copying previously uncopied ones of the randomly selected portion of the rows of the driving table to a corresponding table of the shadow database, instructions for using the representation of the connected graph to perform a depth first search, to find a corresponding next related table of the relational database, instructions for copying previously uncopied ones of the corresponding next related table, referred to by copied data of a corresponding previous related table of the relational database, to a table of the shadow database corresponding to the corresponding next related table of the relational database, instructions for repeating execution of the instructions for using the representation of the connected graph to perform a depth first search to find a corresponding next related table of the relational database, and repeating execution of the instructions for copying previously uncopied ones of the corresponding next related table, referred to by copied data of a corresponding previous related table of the relational database, to a table of the shadow database corresponding to the corresponding next related table of the relational database, and instructions for recreating, in the shadow database, tables, indexes, and foreign keys from the relational database.

9. The processing device of claim 8, wherein the memory further comprises:

instructions for extracting information regarding the tables, the indexes, and the foreign keys from the relational database and storing the extracted information in a plurality of files, such that each of the plurality of files corresponds to a respective table of the relational database, wherein:

the instructions for recreating, in the shadow database, tables, indexes, and foreign keys from the relational database further comprise:

instructions for recreating the tables, the indexes, and the foreign keys from the extracted information stored in the plurality of files.

10. The processing device of claim 9, wherein the stored plurality of files are eXtensible Markup Language (XML) files.

11. The processing device of claim 8, wherein the instructions for the copying of previously uncopied ones of the corresponding next related table of the relational database, referred to by copied data of the corresponding previous related table of the relational database further comprise:

instructions for joining a table of the shadow database corresponding to the corresponding previous related table of the relational database with the corresponding next related table of the relational database to produce matching rows from the corresponding next related table, and instructions for adding previously uncopied ones of the produced matching rows from the corresponding next related table to a table of the shadow database corresponding to the corresponding next related table, the memory further comprising:

instructions for detecting whether a loop occurs in the connected graph, and instructions for attempting to find a new next related table in another branch of the connected graph when the corresponding next related table is detected as being in the detected loop and all of the produced matching rows from the corresponding next related table have already been copied to the shadow database.

12. The processing device of claim 8, wherein the memory further comprises:

instructions for determining whether a second driving table exists in the relational database; and instructions for performing a plurality of acts when the second driving table is determined to exist, the plurality of acts comprising:

randomly selecting, approximately, a fixed sized portion of the target percentage, p, of rows of the second driving table of the relational database, and copying ones of the randomly selected portion of the rows of the second driving table to a corresponding table of the shadow database.

13. The processing device of claim 8, wherein the instructions for randomly selecting, approximately, a fixed sized portion of the target percentage, p, of rows of a driving table of the relational database further comprise:

instructions for removing the driving table from consideration and finding a new driving table based on the representation of the connected graph when an attempt to find a first row of a driving table, not already copied to the shadow database fails.

14. A machine-readable storage medium having recorded thereon instructions for at least one processor, the instructions comprising:

instructions for completely copying all domain tables of a relational database to a shadow database having a same structure as the relational database;

instructions for dividing a desired percentage, p, by a value, c, to create a target iteration slicing percentage of p/c;

instructions for randomly selecting a plurality of rows from the driving table, such that the randomly selected plurality of rows are approximately p/c % of data included in the driving table;

instructions for copying the randomly selected rows to a corresponding table of the shadow database;

instructions for selecting rows of tables of the relational database, related to the randomly selected rows from the driving table, either directly or indirectly, and copying the selected rows of the tables to corresponding tables of the shadow database, such that referential integrity is preserved;

instructions for determining whether a size of the shadow database is less than the desired percentage of a size of the relational database;

instructions for repeating execution of a plurality of instructions, while the determined size of the shadow database is less than the desired percentage of the size of the relational database, the plurality of instructions comprising:

the instructions for randomly selecting a plurality of rows from the driving table, the instructions for copying the randomly selected rows to a corresponding table of the shadow database, and the instructions for selecting rows of tables of the relational database, related to the randomly selected rows from the driving table, and copying the selected rows of the tables to corresponding tables of the shadow database, such that referential integrity is preserved; and instructions for recreating, in the shadow database constraints from the relational database.

15. The machine-readable storage medium of claim 14, wherein the instructions further comprise:

instructions for extracting information from tables included in the relational database, the information from the tables including indexes and foreign keys, the instructions being further for storing the extracted information in a plurality of files, such that each of the plurality of files corresponds to a respective table of the relational database, and instructions for recreating, in the shadow database, the extracted information from the stored plurality of files.

16. The machine-readable storage medium of claim 14, wherein the instructions for randomly selecting a plurality of rows from the driving table further comprise:

instructions for generating a respective random number, R, for each of the plurality of rows of the driving table, such that 0<R<1, instructions for calculating a respective checksum, CS, for each of the plurality of rows from the driving table, instructions for calculating $N=mod_{100}(R \times CS)$ for each of the plurality of rows, and instructions for selecting a respective row of the plurality of rows of the driving table, when a corresponding value of N<integer(p/c).

17. The machine-readable storage medium of claim 14, further comprising:

instructions for creating a representation of a connected graph based on a schema description of the relational database, tables of the relational database being represented by nodes of the connected graph, and foreign keys relating to the tables of the relational database being represented by graph edges connecting the nodes representing the tables, wherein the instructions for selecting rows of tables of the relational database, related to the randomly selected rows from the driving table, and copying the selected rows of the tables to corresponding tables of the shadow database, such that referential integrity is preserved further comprise:

instructions for performing a depth first search, starting from the driving table, by referring to the representation of the connected graph.

18. The machine-readable storage medium of claim 14, wherein the instructions further comprise:

instructions for determining whether foreign keys exist in the relational database, and instructions for performing a plurality of acts when the foreign keys are determined not to exist in the relational database, the plurality of acts comprising:

randomly selecting, approximately, p % of a plurality of rows from each respective table of the relational database, and copying the p % of the plurality of rows from each respective table of the relational database to a respective corresponding table of the shadow database.

19. The machine-readable storage medium of claim 14, wherein the instructions for selecting rows of tables of the relational database, related to the randomly selected rows from the driving table, either directly or indirectly, and copying the selected rows of the tables to corresponding tables of the shadow database, such that referential integrity is preserved further comprise:

instructions for joining a table of the shadow database, corresponding to a previously copied portion of a table from the relational database, with a second table of the relational database to produce matching records, and instructions for adding the matching records to a second table of the shadow database corresponding to the second table of the relational database.

20. The machine-readable storage medium of claim 14, wherein the instructions comprise:

instructions for determining whether a second driving table exists in the relational database, and instructions for performing a plurality of acts when the second driving table is determined to exist, the plurality of acts comprising:

randomly selecting, approximately, a fixed sized portion of the target percentage, p, of rows of the second driving table of the relational database, and copying ones of the randomly selected portion of the rows of the second driving table to a corresponding table of the shadow database.

* * * * *